(12) United States Patent
Bogner

(10) Patent No.: US 8,296,844 B2
(45) Date of Patent: Oct. 23, 2012

(54) PROTECTION AGAINST IMPERSONATION ATTACKS

(75) Inventor: Etay Bogner, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 860 days.

(21) Appl. No.: 12/052,246

(22) Filed: Mar. 20, 2008

(65) Prior Publication Data

US 2008/0235794 A1    Sep. 25, 2008

Related U.S. Application Data

(60) Provisional application No. 60/919,548, filed on Mar. 21, 2007.

(51) Int. Cl.
*H04L 29/06* (2006.01)

(52) U.S. Cl. ........................................................ 726/22

(58) Field of Classification Search .................... 726/22; 713/188, 153, 151
See application file for complete search history.

(56) References Cited

U.S. PATENT DOCUMENTS

| | | | |
|---|---|---|---|
| 6,167,448 A | 12/2000 | Hemphill et al. | |
| 6,859,878 B1 | 2/2005 | Kerr et al. | |
| 6,931,446 B1 | 8/2005 | Cox et al. | |
| 7,036,006 B2 | 4/2006 | Bandhole et al. | |
| 7,047,377 B2 | 5/2006 | Elder et al. | |
| 7,107,463 B2 | 9/2006 | England et al. | |
| 7,210,169 B2 | 4/2007 | Smith et al. | |
| 7,284,054 B2 | 10/2007 | Radhakrishman | |
| 7,302,698 B1 | 11/2007 | Proudler et al. | |
| 7,330,981 B2 | 2/2008 | Willman | |
| 7,516,457 B2 | 4/2009 | Eilam et al. | |
| 7,558,864 B2 | 7/2009 | Kalantar et al. | |
| 7,593,413 B2 | 9/2009 | Raisch | |
| 7,647,589 B1 | 1/2010 | Dobrovolskiy et al. | |
| 7,698,660 B2 | 4/2010 | Sanchez et al. | |
| 7,756,981 B2 * | 7/2010 | Shastri et al. | 709/227 |
| 2002/0029276 A1 | 3/2002 | Bendinelli et al. | |
| 2002/0119427 A1 | 8/2002 | Brown et al. | |
| 2002/0194482 A1 | 12/2002 | Griffin et al. | |
| 2002/0194496 A1 | 12/2002 | Griffin et al. | |
| 2003/0084348 A1 * | 5/2003 | Miyao et al. | 713/201 |
| 2003/0167410 A1 | 9/2003 | Rigstad et al. | |
| 2003/0172109 A1 | 9/2003 | Dalton et al. | |
| 2003/0188193 A1 | 10/2003 | Venkataramappa | |

(Continued)

FOREIGN PATENT DOCUMENTS

WO    2008/018055    2/2008

(Continued)

OTHER PUBLICATIONS

U.S. Appl. No. 11/835,995 Official Action dated Jan. 7, 2010.

(Continued)

*Primary Examiner* — Ali Abyaneh

(74) *Attorney, Agent, or Firm* — Blakely, Sokoloff, Taylor & Zafman LLP

(57) ABSTRACT

A computing method includes running on a user computer a first operating environment for performing general-purpose operations and a second operating environment, which is configured expressly for interacting with a server in a protected communication session and is isolated from the first operating environment. A program running in the second operating environment detects an attempt to imitate the protected communication session made by an illegitimate communication session that interacts with the first operating environment. The detected attempt is inhibited automatically.

33 Claims, 2 Drawing Sheets

U.S. PATENT DOCUMENTS

| | | |
|---|---|---|
| 2003/0202522 A1 | 10/2003 | Jiang |
| 2004/0054901 A1 | 3/2004 | England et al. |
| 2004/0088536 A1 | 5/2004 | Lim et al. |
| 2004/0139141 A1 | 7/2004 | Lessard |
| 2004/0172574 A1 | 9/2004 | Wing et al. |
| 2005/0033980 A1 | 2/2005 | Willman et al. |
| 2005/0114683 A1 | 5/2005 | Jin et al. |
| 2005/0125537 A1 | 6/2005 | Martins et al. |
| 2005/0132031 A1 | 6/2005 | Sailer et al. |
| 2005/0132229 A1 | 6/2005 | Zhang et al. |
| 2005/0144447 A1 | 6/2005 | England et al. |
| 2005/0183143 A1* | 8/2005 | Anderholm et al. ............ 726/22 |
| 2005/0221766 A1 | 10/2005 | Brizek et al. |
| 2005/0223221 A1* | 10/2005 | Proudler et al. ............. 713/164 |
| 2006/0017953 A1 | 1/2006 | Ly et al. |
| 2006/0053215 A1 | 3/2006 | Sharma |
| 2006/0136910 A1 | 6/2006 | Brickell et al. |
| 2006/0230438 A1 | 10/2006 | Shappir et al. |
| 2007/0044143 A1 | 2/2007 | Zhu et al. |
| 2007/0061887 A1 | 3/2007 | Hoover et al. |
| 2007/0094503 A1 | 4/2007 | Ramakrishna |
| 2007/0101400 A1 | 5/2007 | Freeman et al. |
| 2007/0112774 A1* | 5/2007 | Cheshire ........................... 707/9 |
| 2007/0129987 A1 | 6/2007 | Hauser et al. |
| 2007/0143629 A1 | 6/2007 | Hardjono et al. |
| 2007/0168375 A1 | 7/2007 | Yu |
| 2007/0192836 A1 | 8/2007 | Shiran et al. |
| 2007/0260866 A1 | 11/2007 | Wang et al. |
| 2007/0261125 A1 | 11/2007 | Ginter et al. |
| 2007/0271618 A1 | 11/2007 | Chao et al. |
| 2007/0300220 A1 | 12/2007 | Seliger et al. |
| 2008/0040470 A1 | 2/2008 | Bogner |
| 2008/0040478 A1 | 2/2008 | Bogner |
| 2008/0046738 A1* | 2/2008 | Galloway et al. ............. 713/176 |
| 2008/0059804 A1 | 3/2008 | Shah et al. |
| 2008/0101223 A1* | 5/2008 | de los Reyes ................. 370/230 |
| 2008/0114844 A1 | 5/2008 | Sanchez et al. |
| 2008/0209544 A1 | 8/2008 | Kempka |
| 2008/0222280 A1 | 9/2008 | Lippincott et al. |
| 2008/0235779 A1 | 9/2008 | Bogner |
| 2008/0235794 A1 | 9/2008 | Bogner |
| 2009/0043971 A1 | 2/2009 | Kim |
| 2009/0049297 A1 | 2/2009 | Omernick et al. |
| 2009/0049510 A1 | 2/2009 | Zhang et al. |
| 2009/0100272 A1 | 4/2009 | Smeets |
| 2009/0164377 A1 | 6/2009 | Aissi |
| 2009/0276783 A1 | 11/2009 | Johnson et al. |
| 2010/0154037 A1 | 6/2010 | Sabin et al. |
| 2010/0218236 A1 | 8/2010 | Hardjono et al. |

FOREIGN PATENT DOCUMENTS

| | | |
|---|---|---|
| WO | 2008114257 A2 | 9/2008 |
| WO | WO-2008114257 | 9/2008 |

OTHER PUBLICATIONS

U.S. Appl. No. 11/836,028 Official Action dated Dec. 12, 2009.

Trusted Computing Group (TCG), "TPM Main Part 1 Design Principles", Specification Version 1.2 Level 2 Revision 103, Jul. 9, 2007.

International Application PCT/IL2007/000954 Preliminary Report on Patentability dated Apr. 23, 2009.

International Application PCT/IL2007/000954 Search Report dated Aug. 5, 2008.

Weiss et al., U.S. Appl. No. 12/348,357 "Stateless attestation system" filed Jan. 5, 2009.

International Application PCT/IL2009/000019 Search Report dated May 18, 2009.

Bogner, E., U.S. Appl. No. 12/477,167 "Secure multi-purpose computing client" filed Jun. 3, 2009.

U.S. Appl. No. 11/836,028 Official Action dated Jun. 9, 2010.

International Application PCT/IB2009/052347 Search Report dated Oct. 20, 2009.

International Application PCT/IL2008/00382 Search Report dated Jan. 5, 2009.

Office Action from U.S. Appl. No. 11/835,995 mailed Mar. 4, 2011, 18 pages.

Office Action from U.S. Appl. No. 12/052,336 mailed Mar. 10, 2011, 18 pages.

Final Office Action from U.S. Appl. No. 11/835,995 mailed Jul. 22, 2010, 16 pages.

Office Action from U.S. Appl. No. 11/836,028 mailed Dec. 21, 2010.

Final Office Action from U.S. Appl. No. 11/836,028 mailed Jun. 7, 2011, 18 pages.

Final Office Action from U.S. Appl. No. 11/835,995 mailed Aug. 17, 2011, 18 pages.

Final Office Action from U.S. Appl. No. 12/052,336 mailed Oct. 20, 2011, 17 pages.

Office Action from U.S. Appl. No. 11/835,995 mailed Jan. 7, 2010, 22 pages.

Office Action from U.S. Appl. No. 11/836,028 mailed Dec. 30, 2009.

Final Office Action from U.S. Appl. No. 11/836,028 mailed Jun. 9, 2010.

Final Office Action from U.S. Appl. No. 12/477,167 mailed Dec. 23, 2011, 27 pages.

Office Action from U.S. Appl. No. 12/348,357 mailed Nov. 28, 2011, 22 pages.

* cited by examiner

PROTECTION AGAINST IMPERSONATION ATTACKS

CROSS-REFERENCE TO RELATED APPLICATIONS

This application claims the benefit of U.S. Provisional Patent Application 60/919,548, filed Mar. 21, 2007, whose disclosure is incorporated herein by reference.

FIELD OF THE INVENTION

The present invention relates generally to computer networks, and particularly to methods and systems for secure communication over data communication networks.

BACKGROUND OF THE INVENTION

Various applications allow users to interact with a computer system of an organization over the Internet or other public network. Such applications are often referred to as extranet applications. For example, extranet applications enable users to carry out financial transactions with organizations such as banks or insurance companies and make purchases using electronic commerce (e-commerce) web-sites. Employees can access organization data remotely over the Internet, and physicians can access medical records maintained by health institution database systems.

Communication security is often a prime consideration in the design and deployment of extranet applications, especially since extranet communication traffic traverses a public network and since user computers are often not under the control of the organization. Several methods and systems for increasing the security of extranet communication are known in the art.

For example, U.S. Patent Application Publication 2002/0029276, whose disclosure is incorporated herein by reference, describes methods and systems for enabling a network connection between first and second processors using at least one additional processor separate from the first and second processors. As another example, U.S. Pat. No. 7,210,169, whose disclosure is incorporated herein by reference, describes an originator device, which allows for a unique pass-phrase to be communicated to a service system. The originator device has a fixed token, in which a unique platform identifier is recorded, and a processor that generates a representation of the platform configuration. The representation is communicated to a registry service as a unique, platform-specific pass-phrase associated with the originator.

Some security methods and systems attempt to verify the integrity of the operating environment of a server or user computer, i.e., verify that the operating environment has not been corrupted or tampered with. For example, U.S. Patent Application Publication 2005/0221766, whose disclosure is incorporated herein by reference, describes a method and apparatus for performing dynamic attestation for a communication system. Several methods for measuring and reporting the integrity of a system, such as a wireless device, are described.

U.S. Patent Application Publication 2005/0132031, whose disclosure is incorporated herein by reference, describes a system and method for providing attestation and/or integrity of a server execution environment. One or more parts of the server environment are selected for measurement. The selected parts are measured, and the measurements result in a unique fingerprint for each selected part. The unique fingerprints are aggregated by an aggregation function to create an aggregated value, which is determinative of running programs in the server environment. A measurement parameter may include the unique fingerprints, the aggregated value or a base system value and may be sent over a network interface to indicate the server environment status or state.

SUMMARY OF THE INVENTION

Embodiments of the present invention provide a computing method, including:

running on a user computer a first operating environment for performing general-purpose operations and a second operating environment, which is configured expressly for interacting with a server in a protected communication session and is isolated from the first operating environment;

detecting by a program running in the second operating environment an attempt to imitate the protected communication session made by an illegitimate communication session that interacts with the first operating environment; and automatically inhibiting the detected attempt.

In some embodiments, the second operating environment is isolated from the first operating environment such that the general-purpose operations performed in the first operating environment do not affect operation of the second operating environment, and running the second operating environment includes verifying a trustworthiness of the second operating environment by a central management system that is external to the user computer.

In a disclosed embodiment, detecting the attempt includes predefining an element that appears in the protected communication session and is unlikely to appear in communication sessions other than the protected communication session, and identifying that the predefined element appears in the illegitimate communication session. Predefining the element may include accepting a definition of the element from a central management system that is external to the user computer.

In another embodiment, the protected communication session displays a Graphical User Interface (GUI) including a characteristic GUI feature, and detecting the attempt includes detecting that a suspected communication session interacting with the first operating environment displays a GUI feature imitating the characteristic GUI feature. In yet another embodiment, detecting the attempt includes reading a frame buffer, which stores a graphical image that is displayed in the user computer during the suspected communication session, and detecting the GUI feature imitating the characteristic GUI feature in the frame buffer.

In still another embodiment, detecting the attempt includes predefining a textual element that is characteristic of textual input that is provided by a user of the user computer during the protected communication session, monitoring input that is entered by the user during a suspected communication session interacting with the first operating environment and, responsively to detecting the textual element in the input, identifying the suspected communication session as illegitimate. In an embodiment, the textual element includes security credentials of the user. In a disclosed embodiment, predefining the textual element includes defining a characteristic format, and detecting the textual element includes detecting text that matches the characteristic format in the monitored input. Monitoring the input typically includes monitoring keystrokes of a keyboard of the user computer.

In some embodiments, the protected communication session provides a given content to the user computer, and detecting the attempt includes detecting that a suspected communication session interacting with the first operating environment provides the given content to the user computer.

In an embodiment, detecting the attempt includes monitoring network traffic sent to the user computer with respect to the suspected communication session, and identifying the given content in the monitored network traffic. In another embodiment, at least part of the network traffic sent to the user computer is encrypted, and monitoring the network traffic includes monitoring the at least part of the network traffic after the at least part of the network traffic has been decrypted by the first operating environment. In a disclosed embodiment, detecting the attempt includes predefining an attribute of the given content, and detecting that the suspected communication session provides a data item having the attribute to the user computer.

In some embodiment, detecting the attempt includes monitoring a physical resource of the user computer by a virtualization layer of the user computer. Inhibiting the attempt includes accepting a policy, which specifies an action for inhibiting the attempt, from a central management system that is external to the user computer, and performing the action in accordance with the policy.

There is additionally provided, in accordance with an embodiment of the present invention, a user computer, including:

an interface, which is operative to communicate with a server over a communication network; and a processor, which is coupled to run a first operating environment, which is configured to perform general-purpose operations, and a second operating environment, which is configured expressly for interacting with the server in a protected communication session and is isolated from the first operating environment, wherein the second operating environment is further configured to detect an attempt to imitate the protected communication session made by an illegitimate communication session that interacts with the first operating environment, and to automatically inhibit the detected attempt.

There is further provided, in accordance with an embodiment of the present invention, a computer software product for use in a user computer, the product including a computer-readable medium, in which program instructions are stored, which instructions, when executed by the user computer, cause the user computer to communicate with a server over a communication network, to run a first operating environment for performing general-purpose operations, to run a second operating environment, which is configured expressly for interacting with the server in a communication session and is isolated from the first operating environment, to detect by a program running in the second operating environment an attempt to imitate the protected communication session made by an illegitimate communication session that interacts with the first operating environment, and to automatically inhibit the detected attempt.

The present invention will be more fully understood from the following detailed description of the embodiments thereof, taken together with the drawings in which:

DETAILED DESCRIPTION OF EMBODIMENTS

Overview

Figure 1:
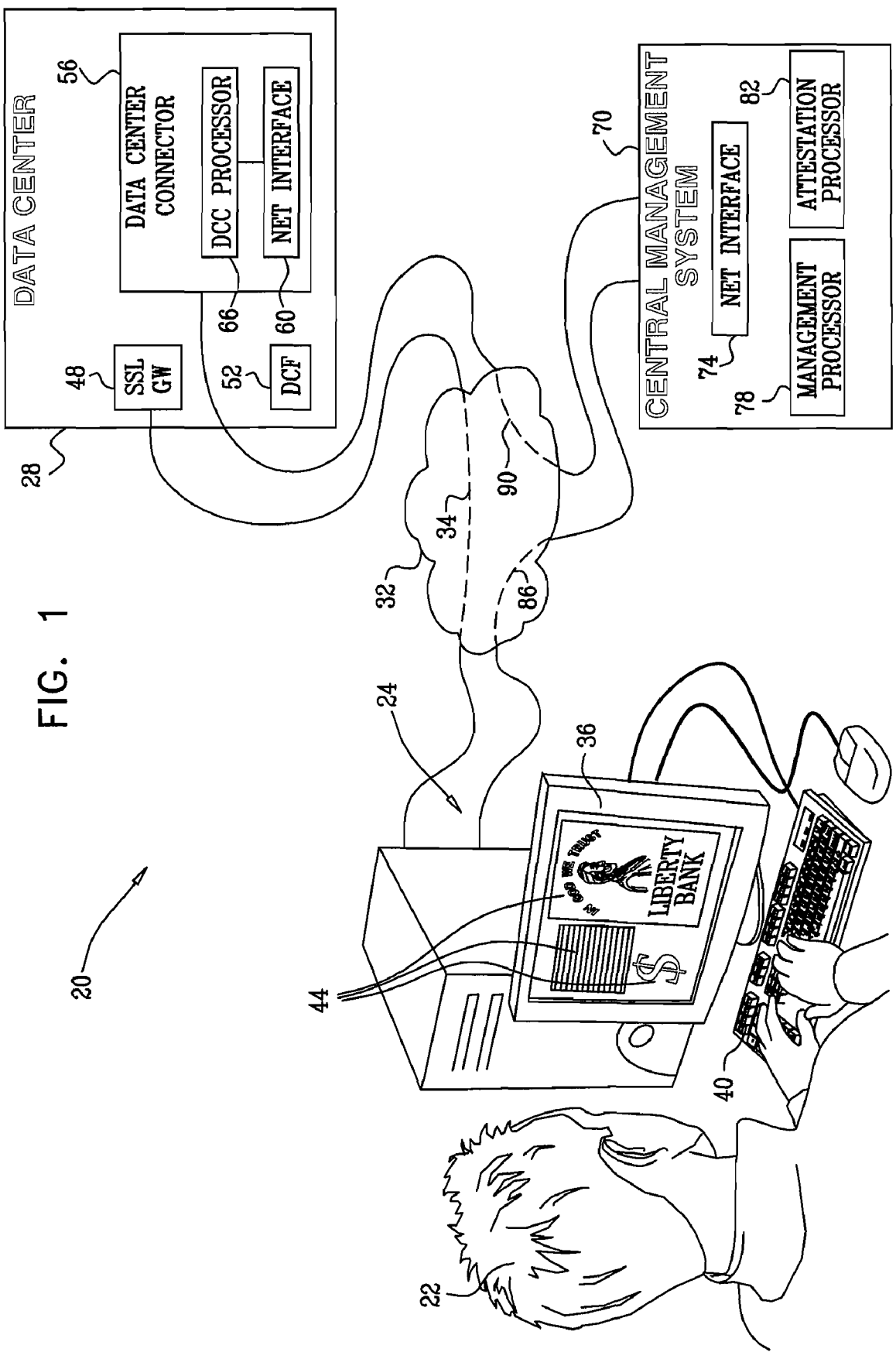
FIG. 1 is a block diagram that schematically illustrates a system for secure communication, in accordance with an embodiment of the present invention.

Communication sessions, and sessions of extranet applications in particular, are sometimes subject to impersonation attacks. In an impersonation attack, an illegitimate application attempts to fool a user into believing he or she is communicating with a legitimate server. Typically, an impersonation attack initiates an illegitimate communication session with a user computer, attempting to impersonate the "look and feel" of a legitimate communication session. Impersonation attacks are often used for "phishing," i.e., for soliciting users to disclose the security credentials they use for authentication with the mimicked legitimate server.

Embodiments of the present invention provide improved methods and systems for detecting and protecting against impersonation attacks. In some embodiments that are described hereinbelow, the user computer runs two operating environments, which are referred to herein as a General-Purpose Operating Environment (GPOE) and a Trusted Operating Environment (TOE). The GPOE performs general-purpose operations of the user computer. The TOE, on the other hand, is configured expressly for conducting protected communication sessions with a certain predefined server. Typically, the TOE is isolated from the GPOE and its trustworthiness is verified by an external Central Management System (CMS).

A protection process, which runs in the TOE, detects impersonation attacks using methods that are described in detail hereinbelow. The protection process detects illegitimate communication sessions, which interact with the GPOE and attempt to imitate legitimate protected communication sessions. When the protection process detects an illegitimate communication session, it carries out or invokes appropriate action in order to inhibit the detected impersonation attempt. For example, the protection process may terminate the detected illegitimate session and/or trigger an alert.

In some embodiments, the protection process detects an attack by identifying Graphical User Interface (GUI) features of the protected communication session that are being imitated by the illegitimate session. For example, a legitimate protected session with a web site of a bank may display the bank's logo. A communication session that interacts with the GPOE and displays a similar logo may be indicative of an impersonation attack.

Additionally or alternatively, the protection process may detect illegitimate sessions on the basis of input that is entered by the user during communication sessions. In these embodiments, the protection process monitors the input that is provided by the user during communication sessions that interact with the GPOE, and attempts to identify textual input that is characteristic of the protected communication sessions. For example, the protection process may attempt to identify user security credentials (e.g., username or password), which are used for authentication in the protected session. Entry of such textual input during a session that interacts with the GPOE is likely to indicate that the user is interacting with an illegitimate session.

In other embodiments, the protection process identifies content (e.g., textual or graphical files) that is characteristically provided to the user computer during protected communication sessions. When a session interacting with the GPOE delivers such content to the user computer, the session is suspected of being illegitimate.

Some known impersonation detection methods run protection processes in the general-purpose operating environment. Unlike these methods, the methods and systems described herein operate the protection functionality from within the isolated TOE, whose trustworthiness is continually assessed by a trusted external entity (the CMS). Thus, the immunity of the user computer against impersonation attacks is considerably enhanced, at least with respect to impersonation of the predefined server or servers with which the TOE is intended to interact. The enhanced security provided by the disclosed methods and systems enables organizations to deploy extranet applications with improved cost-effectiveness and user satisfaction and reduced risk of attack.

System Description

FIG. 1 is a block diagram that schematically illustrates a system 20 for secure communication, in accordance with an embodiment of the present invention. In system 20, a user 22 operating a user computer 24 interacts with a server, such as a data center 28. Data center 28 may comprise, for example, an e-commerce web-site, a computer system of a financial institution or other organization, a database server and/or any other suitable computing platform that interacts with users or clients. The data center may comprise one or more computing platforms. Users may comprise, for example, customers, suppliers, employees or partners of the organization. Although FIG. 1 shows only a single user for the sake of clarity, a typical system comprises multiple users connected to the data center at any given time.

User computer 24 and data center 28 communicate over a communication network 32, via a secure connection 34. Network 32 may comprise a Wide Area Network (WAN), such as the Internet, a Metropolitan Area Network (MAN), a Local Area Network (LAN), a wired or wireless data network, or any other suitable network or combination of network types. Typically, at least part of network 32 is public.

User computer 24 may comprise a personal computer, a mobile computing/communication device or any other suitable user terminal. In the context of the present patent application and in the claims, the term "user computer" is used broadly and refers to any type of computing platform that is capable of communicating over a network. Computer 24 comprises a display 36 for displaying information to user 22, and an input device, such as a keyboard 40 or a mouse, for receiving user input. The internal structure of computer 24 is described in greater detail in FIG. 2 below. In particular, the user computer runs two separate operating environments, referred to as a General-Purpose Operating Environment (GPOE) and a Trusted Operating Environment (TOE).

User 22 interacts with the data center in a protected communication session. During the protected session, the extranet application displays a certain Graphical User Interface (GUI) to the user. The GUI comprises various GUI features 44, such as windows, textual elements, frames, logos, images or other graphical marks. The application also transfers various types of content, such as textual or graphical files, from the data center to the user computer. The user typically interacts with the extranet application by providing various types of input, such as entering textual input using keyboard 40.

Secure connection 32, which connects user computer 24 with data center 28, may comprise a connection that uses the well-known Secure Sockets Layer (SSL) protocol. The data center typically comprises an SSL Gateway (SSL GW) 48, which terminates the SSL connection at the data center end, and is able to allow or deny connection to the data center. Typically but not necessarily, the users connect to the data center by connecting to a web server of the data center and accessing a web portal using a web browser. The SSL GW and web server may comprise separate computing platforms or be integrated in a single platform. In some embodiments, data center 28 comprises a Data Center packet Filter (DCF) 52, which filters packets arriving at the data center.

In some embodiments, system 20 comprises a Central Management System (CMS) 70, which monitors, configures and controls the TOE of computer 24. CMS 70 comprises a network interface 74, which is connected to network 32. The CMS typically comprises a management processor 78, which carries out the monitoring, control and configuration functions described herein and an attestation processor 82, which carries out attestation tests on the user computers.

The CMS communicates with the TOE of the user computer over network 32 using a secure connection 86, such as an SSL connection. The CMS monitors the TOE and attempts to detect situations in which the TOE has been corrupted or modified. The CMS reports the monitoring results to the data center. Since the exclusive task of the TOE is communicating with the data center, and since it typically has a fixed configuration, reliable detection of deviations from normal behavior, configuration and/or performance is feasible.

Data center 28 comprises a Data Center Connector (DCC) 56, which serves as an interface between the CMS and the data center. The DCC communicates with the CMS over network 32 using a secure connection 90, such as an SSL connection. In addition to serving as an interface, the DCC sometimes maintains policies that define how different TOEs are treated by the data center as a function of their trustworthiness, as monitored and reported by the CMS.

DCC 56 comprises a network interface 60 for communicating over network 32, and a DCC processor 66 that carries out the different DCC functions. In some embodiments, DCC 56 comprises a hardware/software unit that is separate from data center 28. Alternatively, the functions of the DCC can be embodied in one or more processors of the data center. The DCC may participate in provisioning of certificates and may enable minor changes in the web portal accessed by the users.

Although FIG. 1 shows a single data center and a single user computer, this configuration was chosen purely for the sake of conceptual clarity. In some embodiments, the methods and systems described herein can be carried out exclusively by user computer 24 and data center 28. Thus, CMS 70 may be omitted in some system configurations. In alternative embodiments, a particular CMS may control multiple user computers. Additionally or alternatively, a particular CMS can operate with multiple data centers or other servers. In some cases each data center belongs to a different organization. In other cases, a certain organization may operate multiple data centers.

Figure 2:
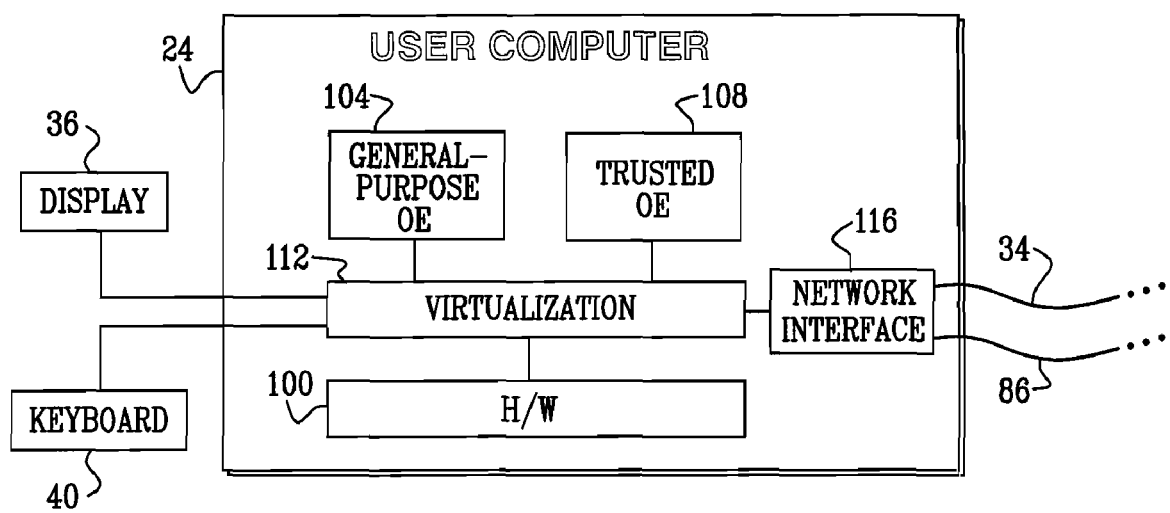
FIG. 2 is a block diagram that schematically illustrates a user computer, in accordance with an embodiment of the present invention.

FIG. 2 is a block diagram that schematically illustrates user computer 24, in accordance with an embodiment of the present invention. Computer 24 comprises hardware 100, typically comprising a processor that carries out the methods described herein, memory devices and any other suitable components or subsystems normally found in computing platforms. The computer comprises a network interface 116, which connects the computer with network 32, such as for communicating with data center 28 and/or CMS 70.

Computer 24 (or, more accurately, the processor in hardware 100) runs two operating environments in parallel. A Trusted Operating Environment (TOE) 108 is configured expressly for communicating with data center 28. A General-Purpose Operating Environment (GPOE) 104 runs the different applications of the computer other than the extranet application. For example, in some embodiments the GPOE comprises a Microsoft® Windows® operating system, and the TOE comprises a Linux® operating system that runs a Firefox® browser. Alternatively, any other suitable operating system, such as Apple® Mac OS®, can also be used.

GPOE 104 and TOE 108 are decoupled, or isolated, from one another. In other words, the behavior, configuration and performance of one operating environment have little or no effect on the behavior, configuration and performance of the other. In particular, the performance and behavior of the TOE is insensitive to the operation of the GPOE. In some embodiments, the configuration of the TOE may not be entirely fixed, and the TOE may perform certain tasks other than communication with the data center. Thus, the terms "fixed configuration" and "configured exclusively for interacting with the data center" are meant to describe a situation in which the effect of any additional tasks carried out by the TOE is sufficiently minor, such that the TOE configuration is sufficiently fixed to allow reliable detection of anomalous behavior or performance.

Computer 24 comprises a virtualization layer 112, which controls the hardware resources and other resources of computer 24, and allocates the resources to the GPOE and TOE. In particular, the virtualization layer is able to access the graphical information displayed on display 36, such as by reading a frame buffer in which this information is stored. The virtualization layer also monitors keyboard 40, reads the keystrokes entered by user 22 and transfers them to the GPOE and/or TOE. Additionally, the virtualization layer is connected to network interface 116, and is able to intercept the network traffic that enters and leaves the user computer. Any suitable virtualization means, which may be implemented in hardware and/or software, can be used for this purpose. Although the computer configuration of FIG. 2 shows a single TOE, computer 24 may alternatively run two or more TOEs, which are decoupled from one another and from the GPOE, for securely connecting to multiple separate data centers.

Typically, hardware 100 of user computer 24, processors 78 and 82 of CMS 70 and DCC processor 66 of DCC 56 comprise general-purpose processors, which are programmed in software to carry out the functions described herein. The software may be downloaded to the processors in electronic form, over a network, for example, or it may alternatively be supplied to the processors on tangible, computer-readable media, such as CD-ROM. In particular, the TOE configuration may be distributed to the user computer as software code on suitable tangible media. For example, the user may be provided with tangible storage media storing a self-extracting file, which comprises a pre-configured Linux operating system and a Firefox browser that is pre-configured for exclusive communication with the data center.

Additional aspects of implementing security features using computers that run trusted operating environments are described in PCT Publication WO 2008/018055, entitled "Extranet Security," filed Jul. 31, 2007, whose disclosure is incorporated herein by reference.

Detection of Impersonation Attacks

As noted above, a server launching an impersonation attack initiates an illegitimate communication session with the user computer. The illegitimate session recreates the "look and feel" of a legitimate protected communication session.

Embodiments of the present invention provide improved methods and systems for detecting and protecting against impersonation attacks. The methods described herein use the fact that legitimate protected sessions have certain characteristic elements that are rarely found in other sessions. Characteristic elements may comprise, for example, characteristic Graphical User Interface (GUI) features that are displayed to the user, characteristic content that is delivered to the user computer and/or characteristic textual input that is provided by the user during the session. Additionally or alternatively, a characteristic element may comprise any other element of a communication session that is likely to occur in a protected session and unlikely to occur in other sessions. When a characteristic element appears in a communication session that interacts with the GPOE, the session is regarded as an impersonation attack. (Since the TOE of the user computer typically has fixed communication settings and its trustworthiness is assessed externally by the CMS, it is protected against such security threats. Thus, illegitimate communication sessions will typically interact with the GPOE.)

In some embodiments, a protection process runs in the TOE and attempts to identify communication sessions that interact with the GPOE, but have elements that are characteristic of protected sessions that normally interact with the TOE. When the protection process identifies such a session, it classifies the session as an impersonation attack. Typically, an a-priori definition of a set of characteristic elements is provided to the protection process. The set may be updated or modified as desired.

For example, when the user computer conducts a protected communication session with a web site of a bank, the bank's extranet application displays a certain GUI on display 36 of the user computer. This GUI often has one or more characteristic GUI features that are rarely found in other sessions, such as the bank's logo or a particular textual display of the bank's name. Other characteristic GUI features may comprise, for example, a window whose border is of a certain color, a window of a certain pattern or color, a background of a certain design, text in a certain font or color and/or any other graphical feature that is characteristic of the protected session and is rarely found in other sessions.

The protection process may identify characteristic GUI features using any suitable technique, such as using various pattern recognition or image processing methods known in the art. When the protection process detects that a session interacting with the GPOE displays a GUI feature that is similar to a characteristic GUI feature, it classifies the session as an impersonation attack.

Additionally or alternatively, protected sessions can sometimes be characterized by certain textual input that is provided by the user. For example, a user interacting with a server in a protected session will often enter his username, password or other security credentials in order to authenticate to the server. In another cases, a user may enter his bank account number, credit card number, social security number or other personal information during a protected session. These types of textual input are rarely if ever entered by the user during non-protected sessions. In some embodiments, the protection process examines the textual input entered by the user during communication sessions that interact with the GPOE. When the protection process detects that the user has entered textual input that is characteristic of a protected session, the protection process may conclude that the user interacts with an illegitimate session.

As yet another example, communication sessions usually transfer various types of content from the server to the user computer. Such content may comprise, for example, different textual files or graphical files that are presented to the user. Certain content, which is typically specified in advance, may be characteristic of a protected session. In some embodiments, the protection process monitors the traffic that is being transferred from the server to the user computer during sessions that interact with the GPOE. When the protection process detects that a session in the GPOE transfers content that is characteristic of a protected session, the process regards the session as illegitimate.

Typically, the protection process collects and examines attributes of the data content, such as file types, file sizes, file names, file locations such as various kinds of Uniform Resource Identifiers (URIs), or any other suitable information type. For example, the protection process may monitor the traffic transferred from the server during a given session that interacts with the GPOE. Upon detecting a graphical file containing the bank's logo or a textual string containing the bank's name, the process declares the session as an impersonation attack.

The description above refers to the protection process as running in the TOE. Typically, however, the protection process involves both the TOE and virtualization layer 112. Since the virtualization layer controls the physical resources of the user computer, it inherently controls the GPOE, e.g., by emulating the hardware, by controlling hardware events and/or by controlling the GPOE execution. The virtualization layer can thus perform various tests with respect to the operation or behavior of the GPOE, in order to identify illegitimate sessions.

In order to perform such tests, the virtualization layer may halt the GPOE to examine the state or data of its processes. Alternatively, the virtualization layer may conduct tests during idle periods, in which the GPOE does not access physical resources (e.g., when the GPOE waits for a certain hardware event to complete). In some embodiments, the virtualization layer conducts the tests without disrupting the normal operation of the GPOE. The virtualization layer may selectively hide physical resources from the GPOE in order to prevent the GPOE from accessing these resources. Thus, in the context of the present patent application, the virtualization layer is considered as part of the TOE, and the protection process may utilize elements of the virtualization layer, of the TOE, or both. Typically, the CMS verifies the trustworthiness of the virtualization layer, as well.

For example, the virtualization layer typically monitors keyboard 40 of the user computer. The virtualization layer can therefore be used to detect characteristic textual patterns entered by the user, in a manner that is not readily susceptible to circumvention.

In some embodiments, the protection process causes the virtualization layer to monitor the keystrokes entered at the keyboard of the user computer. The virtualization layer buffers the keystrokes in a certain data structure for subsequent processing. The buffering of keystrokes may be synchronous or asynchronous with the delivery of the keystrokes to the GPOE—so that the buffering does not introduce latency or otherwise tamper with the user experience.

The protection process searches the buffered keystrokes and attempts to identify textual input that is characteristic of protected sessions. Characteristic textual input may comprise actual text strings, such as a certain username-password pair that the user is known to use. Additionally or alternatively, the characteristic textual input may comprise characteristic patterns or formats, i.e., text having the general format of a bank account or credit card number. Characteristic formats can be specified using any suitable method, such as using regular expressions. Any suitable technique, such as various known pattern recognition methods, can be used for searching the buffered keystrokes for characteristic textual input.

As another example, the virtualization layer is able to read the frame buffer storing the graphical image that is displayed on display 36 of the user computer. The virtualization layer can therefore be used to detect characteristic GUI features that are displayed by processes running in the GPOE. In some embodiments, the protection process, using the virtualization layer, periodically scans the frame buffer, attempting to recognize characteristic GUI features. Alternatively, the protection process may search the frame buffer in response to a predefined event, i.e., an event specified by a predefined system policy.

As yet another example, the virtualization layer may intercept the network traffic entering the user computer and buffer the intercepted traffic for processing. The protection process searches the buffered network traffic, attempting to identify data content that was predefined as characteristic of protected sessions. The buffering and searching of traffic may be synchronous or asynchronous with the delivery of the traffic to the GPOE—so as to remain transparent to the normal user experience.

In some embodiments, the content provided by the server to the GPOE is encrypted, such as when using SSL or Hypertext Transfer Protocol over SSL (HTTPS). In such embodiments, the methods described herein are particularly useful since they enable the protection process to examine the content after it has been decrypted by the GPOE. Typically, the protection process examines the content after it is decrypted and before it is provided to the GPOE application for presentation.

Protection Method Description

Figure 3:
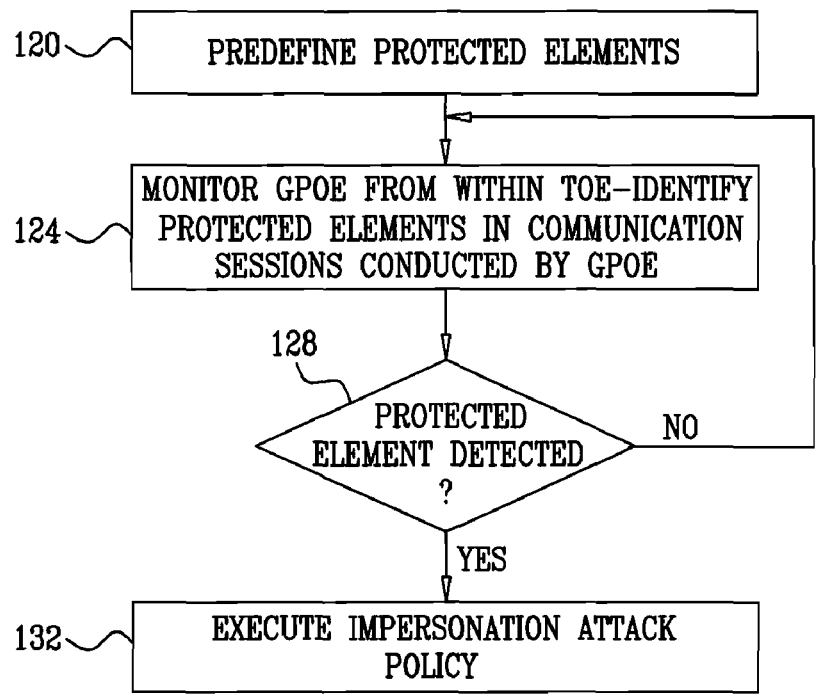
FIG. 3 is a flow chart that schematically illustrates a method for protection against impersonation attacks, in accordance with an embodiment of the present invention.

FIG. 3 is a flow chart that schematically illustrates a method, carried out by user computer 24, for protection against impersonation attacks, in accordance with an embodiment of the present invention. The method is carried out by user computer 24. The method of FIG. 3 begins by predefining a set of one or more protected elements (also referred to as characteristic features or characteristic elements), at a definition step 120. The protected elements may comprise any element that is characteristic of a protected session, as explained above, such as GUI features, content or textual user input. In some embodiments, a set of protected element definitions is provided to TOE 108 of user computer 24 by CMS 70. The set of definitions may be updated from time to time, as desired.

A protection process that runs in the TOE monitors communication sessions that interact with the GPOE and attempt to identify protected elements in these sessions, at a monitoring step 124. The protection process may monitor the images presented to the user during sessions that interact with the GPOE and attempt to identify characteristic GUI features. Alternatively, the process may monitor the text input by the user during such sessions and attempt to identify characteristic textual input. Further alternatively, the process may monitor data content that is provided to the GPOE and attempt to identify characteristic data content.

The protection process typically uses the virtualization layer of the user computer in order to monitor physical resources of the computer in a manner that is difficult to circumvent, such as by monitoring the graphical frame buffer of the computer, the keystrokes entered at the computer keyboard and/or the network traffic entering the computer.

When the protection process detects a protected element, as checked by a checking step 128, it regards the session in question as an illegitimate session. The protection process executes a certain policy for inhibiting impersonation attempts, at an attack inhibiting step 132. In the context of the present patent application and in the claims, the term "inhibiting the attempt" refers to any sort of action that is carried out or invoked by the protection process in order to end or mitigate a detected impersonation attempt, or otherwise act upon the detected attempt. For example, the protection process may inhibit the attempts by terminating the illegitimate session, issuing an alert that reports the attempt and/or take any other suitable action. In some embodiments, policies for inhibiting impersonation attacks are provided to each TOE by the CMS and may be updated as desired at any given time. If, on the other hand, no protected element is found, the method loops back to step 124 above, and the protection process running in the TOE continues to monitor the GPOE.

Although the embodiments described herein mainly address extranet applications in which communication is transported over public networks, the principles of the present invention can also be used for enhancing the security of intranet applications in which communication is confined to a private network.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computing method, comprising:
running on a user computer a first operating environment for performing general-purpose operations and a second operating environment, which is configured expressly for interacting with a server in a protected communication session and is isolated from the first operating environment, wherein general-purpose operations performed in the first operating environment do not affect operation of the second operating environment, wherein in the protected communication session the second operating environment exchanges transaction data with the server via a security protocol, the first operating environment including an operating system and the second operating environment including an operating system separate from the operating system of the first operating environment, wherein the first operating environment does not interact with the server in the protected communication session;
detecting by a program running in the second operating environment an illegitimate communication session in the first operating environment that interacts with the first operating environment, including detecting via pattern recognition an impersonation attack that imitates at least a portion of characteristic elements of the protected communication session in the first operating environment to imitate the protected communication session in the first operating environment, wherein the characteristic elements include graphical user interface (GUI) features associated with the protected communication session that are not expected to be used in the first operating environment; and
automatically inhibiting the detected impersonation attack.

2. The method according to claim 1, wherein running the second operating environment comprises verifying a trustworthiness of the second operating environment by a central management system that is external to the user computer.

3. The method according to claim 1, wherein detecting the impersonation attack comprises predefining an element that appears in the protected communication session and is unlikely to appear in communication session other than the protected communication session, and identifying that the predefined element appears in the illegitimate communication session.

4. The method according to claim 3, wherein predefining the element comprises accepting a definition of the element from a central management system that is external to the user computer.

5. The method according to claim 1, wherein the protected communication session displays a Graphical User Interface (GUI) comprising a characteristic GUI feature, and wherein detecting the impersonation attack comprises detecting that a suspected communication session interacting with the first operating environment displays a GUI feature imitating the characteristic GUI feature.

6. The method according to claim 5, wherein detecting the impersonation attack comprises reading a frame buffer, which stores a graphical image that is displayed in the user computer during the suspected communication session, and detecting the GUI feature imitating the characteristic GUI feature in the frame buffer.

7. The method according to claim 1, wherein detecting the impersonation attack comprises predefining a textual element that is characteristic of textual input that is provided by a user of the user computer during the protected communication session, monitoring input that is entered by the user during a suspected communication session interacting with the first operating environment and, responsively to detecting the textual element in the input, identifying the suspected communication session as illegitimate.

8. The method according to claim 7, wherein the textual element comprises security credentials of the user.

9. The method according to claim 7, wherein predefining the textual element comprises defining a characteristic format, and wherein detecting the textual element comprises detecting text that matches the characteristic format in the monitored input.

10. The method according to claim 7, wherein monitoring the input comprises monitoring keystrokes of a keyboard of the user computer.

11. The method according to claim 1, wherein the protected communication session provides a given content to the user computer, and wherein detecting the impersonation attack comprises detecting that a suspected communication session interacting with the first operating environment provides the given content to the user computer.

12. The method according to claim 11, wherein detecting the impersonation attack comprises monitoring network traffic sent to the user computer with respect to the suspected communication session, and identifying the given content in the monitored network traffic.

13. The method according to claim 12, wherein at least part of the network traffic sent to the user computer is encrypted, and wherein monitoring the network traffic comprises monitoring the at least part of the network traffic after the at least part of the network traffic has been decrypted by the first operating environment.

14. The method according to claim 11, wherein detecting the impersonation attack comprises predefining an attribute of the given content, and detecting that the suspected communication session provides a data item having the attribute to the user computer.

15. The method according to claim 1, wherein detecting the impersonation attack comprises monitoring a physical resource of the user computer by a virtualization layer of the user computer.

16. The method according to claim 1, wherein inhibiting the impersonation attack comprises accepting a policy, which specifies an action for inhibiting the impersonation attack, from a central management system that is external to the user computer, and performing the action in accordance with the policy.

17. A user computer, comprising:
an interface, which is operative to communicate with a server over a communication network; and
a hardware processor, which is coupled to run a first operating environment, which is configured to perform general-purpose operations, and a second operating environment, which is configured expressly for interacting with the server in a protected communication session and is isolated from the first operating environment,
wherein general-purpose operations performed in the first operating environment do not affect operation of the second operating environment,
wherein in the protected communication session the second operating environment exchanges transaction data with the server via a security protocol,
the first operating environment including an operating system and the second operating environment including an operating system separate from the operating system of the first operating environment, wherein the first operating environment does not interact with the server in the protected communication session,
wherein the second operating environment is further configured
to detect an illegitimate communication session in the first operating environment that interacts with the first operating environment, including detecting via pattern recognition an impersonation attack that imitates at least a portion of characteristic elements of the protected communication session in the first operating environment to imitate the protected communication session in the first operating environment, wherein the characteristic elements include graphical user interface (GUI) features associated with the protected communication session that are not expected to be used in the first operating environment, and
to automatically inhibit the detected impersonation attack.

18. The user computer according to claim 17, wherein the hardware processor is coupled to enable a central management system that is external to the user computer to verify a trustworthiness of the second operating environment.

19. The user computer according to claim 17, wherein the hardware processor is coupled to predefine an element that appears in the protected communication session and is unlikely to appear in communication sessions other than the protected communication session, and to detect the impersonation attack by identifying that the predefined element appears in the illegitimate communication session.

20. The user computer according to claim 19, wherein the hardware processor is coupled to accept a definition of the element from a central management system that is external to the user computer.

21. The user computer according to claim 17, wherein the hardware processor is coupled to display during the protected communication session a Graphical User Interface (GUI) comprising a characteristic GUI feature, and to detect the impersonation attack by detecting that a suspected communication session interacting with the first operating environment displays a GUI feature imitating the characteristic GUI feature.

22. The user computer according to claim 21, and comprising a frame buffer for storing graphical images that are displayed during communication sessions, wherein the hardware processor is coupled to detect the impersonation attack by reading the frame buffer during the suspected communication session and detecting the GUI feature imitating the characteristic GUI feature in the frame buffer.

23. The user computer according to claim 17, wherein the hardware processor is coupled to predefine a textual element that is characteristic of textual input that is provided by a user of the user computer during the protected communication session, to monitor input that is entered by the user during a suspected communication session interacting with the first operating environment and, responsively to detecting the textual element in the input, to identify the suspected communication session as illegitimate.

24. The user computer according to claim 23, wherein the textual element comprises security credentials of the user.

25. The user computer according to claim 23, wherein the hardware processor is coupled to define a characteristic format, and to detect the textual element by detecting text that matches the characteristic format in the monitored input.

26. The user computer according to claim 23, and comprising a keyboard, wherein the hardware processor is coupled to monitor the input by monitoring keystrokes of the keyboard.

27. The user computer according to claim 17, wherein the interface is operative to receive a given content during the protected communication session, and wherein the hardware processor is coupled to detect the impersonation attack by detecting that the given content is received during a suspected communication session interacting with the first operating environment.

28. The user computer according to claim 27, wherein the hardware processor is coupled to detect the impersonation attack by monitoring network traffic received via the interface with respect to the suspected communication session, and identifying the given content in the monitored network traffic.

29. The user computer according to claim 28, wherein at least part of the received network traffic is encrypted, and wherein the hardware processor is coupled to decrypt the at least part of the network traffic in the first operating environment, and to monitor the decrypted at least part of the network traffic.

30. The user computer according to claim 27, wherein the hardware processor is coupled to predefine an attribute of the given content, and to detect that a data item having the attribute is provided during the suspected communication session.

31. The user computer according to claim 17, and comprising a virtualization layer for monitoring a physical resource of the user computer, wherein the hardware processor is coupled to detect the impersonation attack by monitoring the physical resource using the virtualization layer.

32. The user computer according to claim 17, wherein the hardware processor is coupled to accept a policy, which specifies an action for inhibiting the impersonation attack, from a central management system that is external to the computer, and to perform the action in accordance with the policy.

33. A computer software product for use in a user computer, the computer software product comprising a non-transitory computer-readable storage medium, storing executable program instructions, which instructions, when executed by the user computer, cause the user computer to perform the operations of:

communicating with a server over a communication network, to run a first operating environment for performing general-purpose operations, to run a second operating environment, which is configured expressly for interacting with the server in a communication session and is isolated from the first operating environment, wherein general-purpose operations performed in the first operating environment do not affect operation of the second operating environment, wherein in the protected communication session the second operating environment exchanges transaction data with the server via a security protocol, the first operating environment including an operating system and the second operating environment including an operating system separate from the operating system of the first operating environment, wherein the first operating environment does not interact with the server in the protected communication session, detecting by a program running in the second operating environment an illegitimate communication session in the first operating environment that interacts with the first operating environment, including detecting via pattern recognition an impersonation attack that imitates at least a portion of characteristic elements of the protected communication session in the first operating environment to imitate the protected communication session in the first operating environment, wherein the characteristic elements include graphical user interface (GUI) features associated with the protected communication session that are not expected to be used in the first operating environment, and automatically inhibiting the detected impersonation attack.

* * * * *